Dec. 1, 1964  D. W. SEXTON ETAL  3,159,787
R.M.S. METER USING AMPLIFIER WITH CONTROLLED FEEDBACK
Filed March 21, 1960  2 Sheets-Sheet 1

INVENTORS
DON W. SEXTON
NEWTON E. BALL
BY  JACK T. DAVIS

ATTORNEYS.

Dec. 1, 1964    D. W. SEXTON ETAL    3,159,787
R.M.S. METER USING AMPLIFIER WITH CONTROLLED FEEDBACK
Filed March 21, 1960    2 Sheets-Sheet 2

INVENTORS
DON W. SEXTON
NEWTON E. BALL
JACK T. DAVIS
BY
ATTORNEYS

United States Patent Office 3,159,787
Patented Dec. 1, 1964

3,159,787
R.M.S. METER USING AMPLIFIER WITH CONTROLLED FEEDBACK
Don W. Sexton, San Diego, Newton E. Ball, La Mesa, and Jack T. Davis, San Diego, Calif., assignors to Electro Instruments, Incorporated, San Diego, Calif., a corporation of Delaware
Filed Mar. 21, 1960, Ser. No. 16,472
5 Claims. (Cl. 324—99)

The present invention relates to means for measuring or making available for use the R.M.S. values of currents and voltages, and has particular reference to such a means which is effective to compare the R.M.S. value of a standard signal to the R.M.S. value of an intermediate signal which is proportional to the R.M.S. value of the unknown input signal. This proportionality is altered or adjusted until the R.M.S. value of the intermediate signal is the same as that of the standard signal, and the adjusted proportionality is thus representative of the R.M.S. value of the input signal.

Apparatus for measuring the R.M.S. values of currents and voltage takes various forms, perhaps the most common being those which employ a thermocouple which is effective to afford an indication of the R.M.S. value through the heating of the thermocouple by the current to be measured. Such apparatus usually has temperature characteristics and calibration stability which vary over a period of time, and accordingly must be calibrated with an accurately known standard prior to each use. The calibrations often require considerable skill and technique, and trained personnel are therefore necessary to properly use the apparatus. Another typical form of R.M.S. measuring apparatus is the electrodynamic instrument which depends upon the effect of the unknown current upon an arrangement of coils. The influence of temperature, outer fields, and higher frequencies tend to reduce the accuracy of this type of instrument over a period of time. Still other forms of R.M.S. measuring apparatus undesirably load the circuit by drawing appreciable power for their operation.

According to the present invention, a means is provided for measuring or otherwise making available the R.M.S. values of currents and voltages, and which is not dependent upon the use of thermocouples or electrodynamic movements. An R.M.S. meter is provided which in its preferred embodiment includes an amplifying means coupled in a high gain feedback loop, the amplifying means accepting the unknown input signal and providing an intermediate signal, a fraction ($\theta$) of which is fed back to the amplifying means. Thus, the amplifying means provides an intermediate signal in response to the unknown input signal and to the fraction ($\theta$). Any difference between the R.M.S. value of the intermediate signal ($E_{int}$) and a standard or reference R.M.S. value is detected, and the nature of the difference is generated as an error signal of the correct sense for adjusting the feedback fraction $\theta$. This adjustment of feedbacks alters the gain of the amplifier means until the R.M.S. value of the intermediate signal is equal to the standard or reference R.M.S. value. The value to which the feedback fraction ($\theta$) is adjusted is directly representative of the value of the unknown R.M.S. input ($E_{int}$) to the amplifier means, and a read out device may be coupled in the circuit to sense ($\theta$) and indicate directly the unknown R.M.S. input value. That is, $E_{in}$ will be equal to $E_{int}$ $\theta$, and $\theta$ is representative of the unknown R.M.S. input value.

The amplifying means conveniently takes the form of a high gain amplifier with an attenuator or a voltage divider connected in the feedback loop around the amplifier. The amplifier-attenuator combination provides the intermediate signal.

The detector or means for detecting any difference between the reference R.M.S. value and the value of the R.M.S. intermediate signal provided by the amplifier includes a full wave rectifier or absolute value converter and a biased diode squaring network. This squaring network accepts the output of the detector and provides a signal proportional to the square of the instantaneous value of the intermediate signal. This signal is algebraically added to the value of an R.M.S. reference or standard signal, and a signal representing this sum is fed into an integrator amplifier and filter such that the polarity and magnitude of the filter output is indicative of the difference in means square value between the intermediate signal and the reference signal used for comparison. The output of the filter is fed into a convertor means, which includes an error amplifier and a digital counter. The error amplifier amplifies the error signal and breaks it down into up or down impulses or spikes effective to trigger the digital counter apparatus for producing a plurality of output signals. Thus, the convertor means converts the error signals to output signals which are then fed to the attenuator which is connected in feedback relation with the amplifier. These output signals automatically alter the feedback fraction $\theta$ The attenuator may be a digital device in which case the read out previously mentioned is a digital device, and is responsive proportionally to the fraction O to automatically display the corresponding R.M.S. value of the input signal.

Other objects and features of this invention will become apparent upon a consideration of the following specification, read in connection with the accompanying drawings, wherein.

Figure 1:
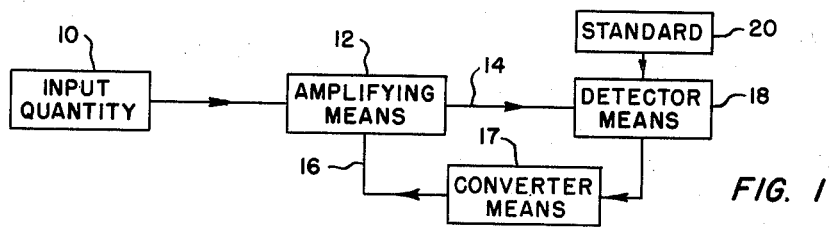
FIGURE 1 is a block diagram illustrating schematically an R.M.S. meter according to the present invention.

Referring to the drawings, FIGURE 1 illustrates in block diagram form an R.M.S. meter which is supplied with an unknown input quantity or signal 10 having an R.M.S. value which is to be determined. Although the present R.M.S. meter is effective to measure or make available the R.M.S. value of input signals of various wave forms, the discussion which follows will conveniently refer to input signal 10 as having a sine wave form.

Input signal 10 is amplified by an amplifier means 12 to deliver an intermediate signal 14. The amplifier means 12 is controlled by control signals 16 provided by a converter 17 which is responsive to error signals generated by a detector means 18. Means 18 is effective to detect the difference in R.M.S. value between the intermediate signal 14 and a reference signal established by an accurately controlled D.C. voltage source, represented diagrammatically at 20, and sometimes referred to as the R.M.S. standard.

Figure 2:
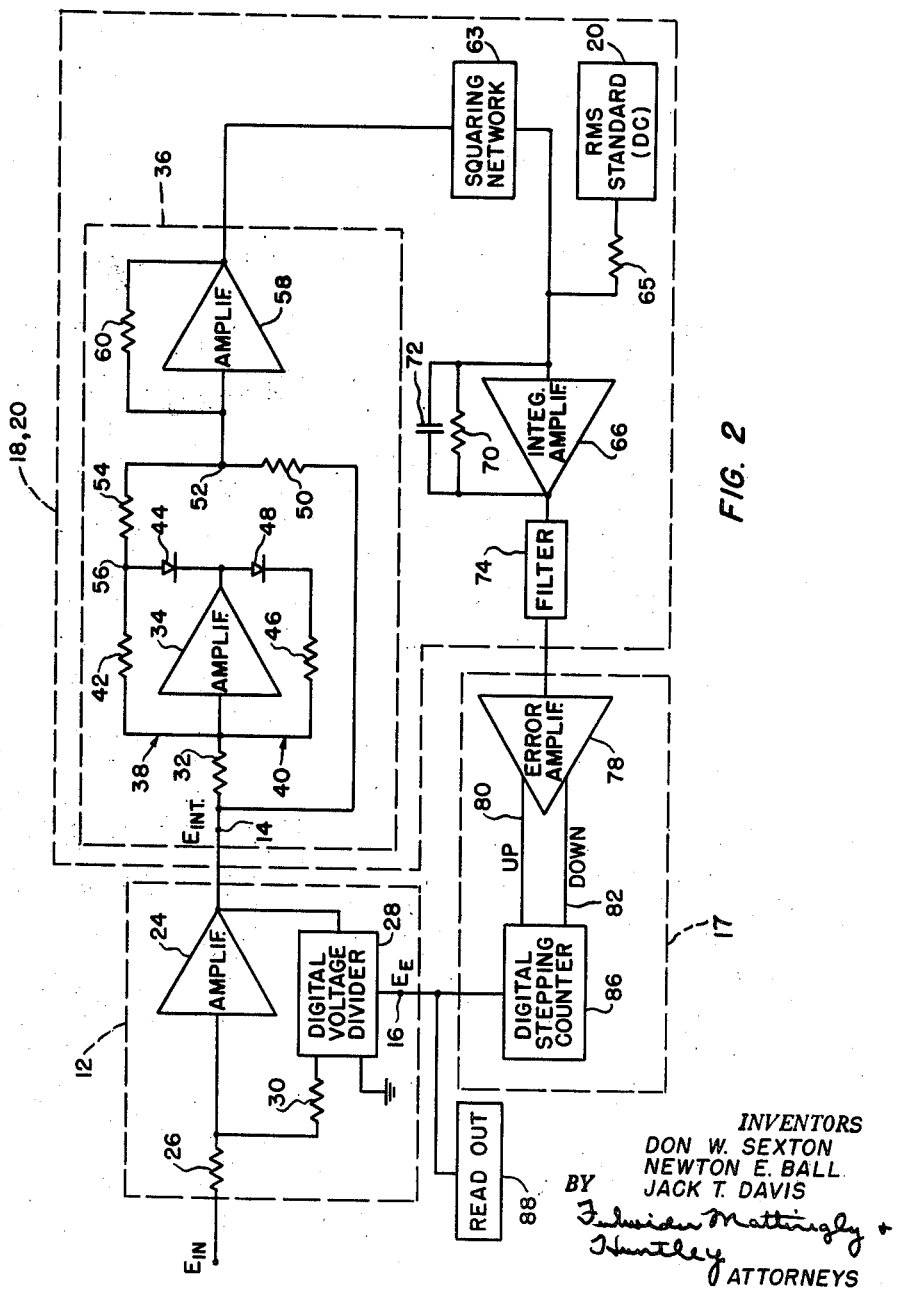
FIGURE 2 is a schematic diagram illustrating in greater detail the construction and arrangement of certain of the components indicated in block diagram form in FIGURE 1.

A specific embodiment of the invention as applied to an R.M.S. meter is illustrated in FIGURE 2. Various portions of the circuit arrangement shown in FIGURE 2 correspond to the various elements of FIGURE 1 and are enclosed in dashed lines or otherwise suitably identified with the same reference characters as are used in FIGURE 1. According to the invention as shown in FIGURE 2, the unknown input quantity 10 is a voltage ($E_{in}$) of sine wave form applied to an amplifier 24 through a resistor 26. Amplifier 24 is effective to invert the wave form of input signal 10, as indicated at 14 in FIGURE 3, and is characterized by a high gain, in the order of 50,000 without feedback.

An attenuating means or digital voltage divider 28 coupled in series with a resistor 30 forms a feedback loop which is connected around amplifier 24 for controlling the gain of amplifier 24.

The values of resistors 26 and 30 are selected as follows. Taking the well known relation for an amplifier (high gain) connected in feedback:

$$\frac{E_{int}}{E_{in}} = \frac{R_a}{R_b}\left(\frac{1}{\theta}\right)$$

where:

$E_{int}$=intermediate signal or output of the amplifier;
$E_{in}$=unknown input signal;
$\theta$=fraction of intermediate signal fed back to amplifier;
$R_a$=value of resistor 30; and
$R_b$=value of resistor 26;

the relation can be restated:

$$E_{in} = \frac{R_b}{R_a} E_{int}\, \theta$$

As will be seen, the present invention is effective to bring $E_{int}$ to a value effectively equal to the value of a reference signal 20 whose value is known. Then, knowing $E_{int}$ to be a constant value effectively equal to this reference value, $$\frac{R_b}{R_a}$$

is selected such that:

$$\frac{R_b}{R_a}(E_{int}) = 10^n$$

where $n=1, 2, 3$, etc.
Then it follows that:

$$E_{in} = \theta \times 10^n$$

Stated another way:

$$E_{int}\theta \propto E_{in}$$

and $E_{int}$ is kept constant, $\theta \propto E_{in}$.

Accordingly, the present invention is effective to adjust $\theta$ so that $E_{int}$ will be brought to a constant value controlled by $E_{ref}$ regardless of the value of $E_{in}$, and a measurement of the magnitude of $\theta$ necessary to accomplish this thus represents the R.M.S. value of input signal 10. Next will be described the manner in which detector means 18 is effective to detect the difference in R.M.S. value between intermediate signal 14 and a fixed point R.M.S. value established by standard 20, and generate an error signal.

The output of amplifier 24, that is, the intermediate signal 14 ($E_{int}$) is applied through a resistor 32 to the input terminal of an amplifier 34 which forms a part of an absolute value converter or full wave rectifier 36, which in turn is a part of detector means 18. A pair of feedback loops 38 and 40 are connected around amplifier 34 and include, respectively, a resistor 42 and a diode 44, and a resistor 46 and a diode 48. Resistors 32, 42, and 46 are preferably of equal value so that the gain of amplifier 34 is unity.

Amplifier 34 is of the same general type as amplifier 24 and effects an inversion of the wave form of reference signal 14. The feedback arrangement produces a constancy of gain and tends to correct for non-linearities of the diodes.

A portion of intermediate signal 14 is applied through a resistor 50 to a terminal 52. Terminal 52 is coupled through a resistor 54, which is half the value of resistor 50, to a terminal 56 of feedback loop 38. The signal at terminal 56, which has a wave form 57, FIGURE 3, is coupled to the portion of the intermediate signal 14 flowing through the circuit of resistance 50, and the combined signal fed into an amplifier 58.

Amplifier 58 is of substantially the same type as amplifiers 24 and 34 and effects an inversion of the wave form of the input signal to it. A resistor 60 is connected in a feedback loop around amplifier 58 and has a value approximately that of resistor 50, establishing a gain of two for amplifier 58 for the signal at terminal 56, and a gain of one for signal at terminal 14.

Figure 3:
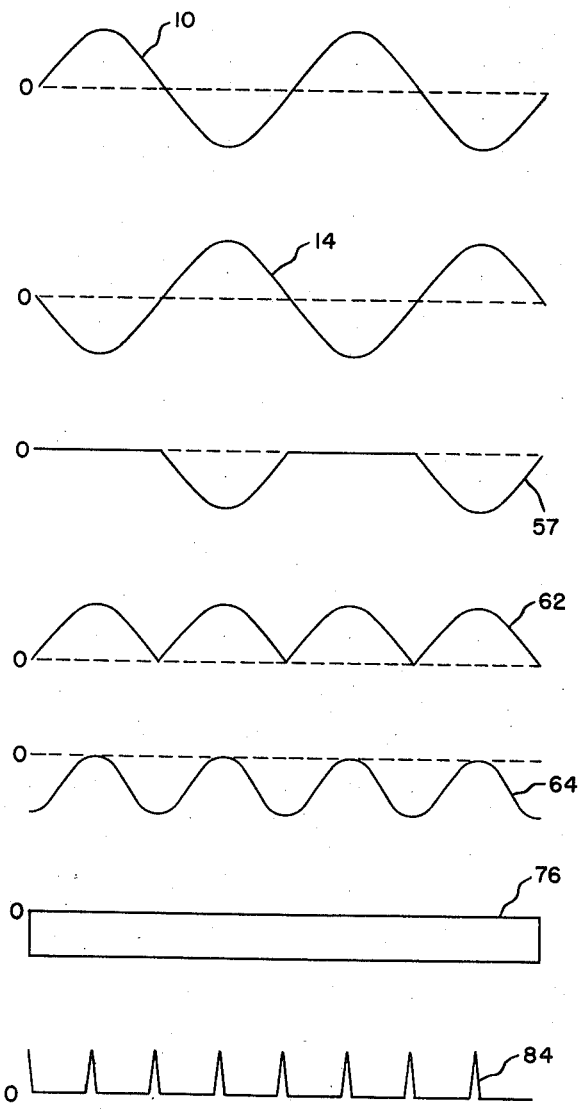
FIGURE 3 illustrates graphically the character of the signal at various points in the circuitry of the present invention.

Amplifier 58 is effective to combine the wave forms of the two inputs to it, completing rectification to the full wave form shown at 62 in FIGURE 3. It is noted that other forms of absolute value convertors or rectifiers may be employed, and rectifier 36 is merely exemplary of one form which is effective to provide an output signal which is the absolute value of the input signal. Full wave rectification is preferably employed so that only one polarity of signal need be squared by the function generator or squaring network 63 to which the output of amplifier 58 is connected.

Network 63 is preferably of the biased diode type and is effective to provide instantaneously squared output values for input values fed into it, the instantaneous squared output wave form being indicated at 64 in FIGURE 3. With this arrangement, the instantaneous squared value of signal 14 is available for comparison with reference standard 20, the comparison being ultimately made of the mean square value of signal 14 and standard 20, in conjunction with an integrating amplifier 66.

In the squaring network employed herein a parabolic function is produced whose slope is increased in steps determined by the resistive values switched in by the network in response to the magnitude of the input signal to the network. The biased diode system is widely used for this switching function and is preferred for use in the present invention. The elements of such networks are well known in the art, and a detailed description will be omitted for the purpose of brevity. It is important primarily that the system used be effective to provide squared output signals fed into it.

The output of network 63 is the square of the instantaneous value of intermediate signal 14 and this output is algebraically summed with the D.C. value of reference 20, herein sometimes referred to as the R.M.S. standard 20, it being noted that the signal from standard 20 first flows through a summing resistor 65 before joining the signal from network 63. Resistor 65 is operative to assist in adjusting the value of the signal from standard 20 so that when intermediate signal 14 is at its fixed or predetermined level the combined signals from network 63 and standard 20 will not be effective to produce an error signal. More particularly, the D.C. signal from reference 20 is not necessarily actually equal to the intermediate signal 14 when signal 14 is at its predetermined value or fixed point. Instead, the D.C. signal from reference 20 is adjusted in value so that no error signal is produced by the system when intermediate signal 14 is at a fixed point or value. This no error signal condition is indicative that the value of $\theta$ registered on the read out means is the measure of the R.M.S. value of the unknown input signal. Of course, the fixed point may be arranged at various levels, depending upon the operational characteristics of the various components of the system, so long as the equivalent R.M.S. value is known for the particular level of reference 20 which is employed.

The outputs of squaring network 63 and standard 20 are connected to an integrating amplifier 66 which is part of detector means 18. A resistor 70 and a capacitor 72 are connected in parallel in a feedback loop around amplifier 66, the ratio of resistor 70 to the resistance values switched in by network 63 serving to establish the gain of amplifier 66, while capacitor 72 changes the full wave form of the input signal to amplifier 66 to a rippled D.C. The final filtering of the signal is accomplished by a conventional low-pass filter 74 coupled to the output of amplifier 66, the shape of the wave form being illustrated at 76 in FIGURE 3. The values of resistor 70 and capacitor 72 primarily dictate the lower limit of frequencies that can be handled by the present invention.

The output of the integrating amplifier 66 depends upon an integral function of the instantaneous input signals to it, and provides, together with network 63 and standard 20, an output representing the mean value of the input signals. That is, the output represents the value of the input signals over an interval of time.

If an error exists in the mean square value of the input signal to network 63, as compared with standard 20, the output of filter 74 will be a positive value when reference signal 14 is too low, and a negative value if signal 14 is too high.

The output of filter 74 is connected to convertor means 17 which includes an error amplifier means 78 effective to sense the direction or polarity of error of the error signal from filter 74, and convert that error into output pulses, either up pulses over lead 80 if the reference signal 14 is too low, or down pulses over lead 82 if the reference signal is too high. These output pulses have the general form shown at 84 in FIGURE 3, and their interval is controlled by error amplifier means 78.

Leads 80 and 82 are connected as inputs to a conventional digital stepping counter 86, forming a part of convertor means 17, and the up or down pulses from filter 74 step the counter 86 up or down accordingly. These pulses to counter 86, as is well known, operate flip-flop circuits which, in the present invention, are effective to provide control signals 16 for positioning the switches of the conventional digital voltage divider 28. The positions of these switches determine the feedback fraction θ for amplifier 24.

Since the signals from counter 86 to the digital potentiometer or voltage divider 28 are representative of the value of θ, a read-out means 88 is connected in this circuit to display the R.M.S. value corresponding to the value of θ at all times. The read-out means digitally steps up or down with the up or down steps in output signals 16 to thereby automatically indicate the R.M.S. value of the unknown input signal to the present R.M.S. meter.

Thus it is seen that the sole reference R.M.S. value in the present invention is the output of a variable gain amplifier, which output is held constant by the system. The correction effected by the system to maintain this output constant is automatically read out as the R.M.S. value of the input signal. With this arrangement it is important to note that the R.M.S. level detector means 18 need not be precisely linear in operation since it is not the magnitude of difference between intermediate signal 14 and the fixed reference which is detected, but rather the fact that a difference exists. In addition, it is noted that control signals 16, representative of the R.M.S. value of the unknown input signal, are available for other useful purposes rather than driving read-out means 88, if desired.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

We claim:

1. An R.M.S. instrument comprising: amplifier means including means for attenuating a feedback signal, said amplifier means being responsive to an input signal and an attenuated feedback signal to produce an intermediate signal; absolute value converting means connected to the output of said amplifier means for providing an output having a value instantaneously proportional to the absolute value of said intermediate signal; a squaring network coupled to the output of said absolute value converting means for squaring said output; means for producing a predetermined reference signal; means for coupling said squaring network with said reference signal producing means for comparison of the output of said squaring network and said reference signal; integrating amplifier means and filter means coupled to accept the signal representing said comparison to provide an error signal of a polarity representing the sense of said comparison; error signal amplifying means coupled to said filter means to amplify and convert said error signal into digital pulses, according to the said polarity; a digital stepping means responsive to said digital pulses to provide a control signal for controlling said attenuating means; and electrical means responsive to the control signal from said digital stepping means.

2. An R.M.S. instrument as set forth in claim 1, wherein said squaring network is of the biased diode type.

3. An R.M.S. instrument, comprising: amplifier means having an input and an output; a variable feedback network connected between the input and output of said amplifier means for controlling the gain and output of said amplifier means by variation of the feedback factor; a squaring network for squaring the output of said amplifier means; an R.M.S. standard of constant magnitude; integration means for comparing the squared output of said squaring network with said R.M.S. standard and generating error signals corresponding to any difference therebetween; means responsive to said error signals for controlling the amount of feedback provided by said feedback network; and means for indicating the feedback factor of said feedback network.

4. An R.M.S. instrument comprising: feedback amplifier means responsive to an input signal and a feedback signal to produce an intermediate signal of a first R.M.S. value, said feedback amplifier means including a high gain amplifier and variable attenuation means connected in a feedback loop around said amplifier; means for producing an R.M.S. reference signal of fixed magnitude; R.M.S. detector means coupled to the output of said amplifier means for detecting any difference between said first R.M.S. value of said intermediate signal and said R.M.S. reference signal; error signalling means connected to the output of said detector means for producing an error signal representing said difference; and converter means connected between the output of said error signalling means and the feedback network of said amplifier means for varying said feedback signal to alter the magnitude of said intermediate signal so as to drive said error signal to zero, the degree of attenuation of said attenuation means being controlled by signals from said converter means, said amplifier thereby providing said intermediate signal proportional to the ratio of said input signal to the amount of feedback of said loop, said attenuation means being responsive to said signals from said converter means to provide a feedback fraction equal to the ratio of said input signal to said intermediate signal; and read-out means responsive to said signals from said converter means for indicating the magnitude of said feedback fraction.

5. An R.M.S. instrument comprising: feedback amplifier means responsive to an input signal and a feedback signal to produce an intermediate signal of a first R.M.S. value; means for producing an R.M.S. reference signal of fixed magnitude; R.M.S. detector means coupled to the output of said amplifier means for detecting any difference between said first R.M.S. value of said intermediate signal and said R.M.S. reference signal; error signalling means connected to the output of said detector means for producing an error signal representing said difference; variable attenuation means connected in the feedback network around said amplifier means for controlling the amount of feedback of said amplifier means in response to said error signal; converter means connected between the output of said error signalling means and the feedback network of said amplifier means for varying said feedback signal to alter the magnitude of said intermediate signal so as to drive said error signal to zero, said converter means including an error amplifier for converting said error signal to digital pulses and stepping means responsive to said digital pulses for controlling said variable attenuation means; and digital read-out means connected to receive the output from said stepping means to indicate the R.M.S. value of said input signal as a function of the amount of feedback provided by said attenuation means.

References Cited by the Examiner

UNITED STATES PATENTS

| | | | |
|---|---|---|---|
| 2,307,308 | 1/43 | Sorensen | 330—86 |
| 2,790,945 | 4/57 | Chope | 324—99 |
| 2,842,740 | 7/58 | Sparks | 324—123 |
| 2,850,627 | 9/58 | Moore | 328—144 |
| 2,857,569 | 10/58 | Gilbert | 324—123 |

WALTER L. CARLSON, *Primary Examiner.*

ELI J. SAX, BENNET G. MILLER, *Examiners.*